May 7, 1940.   J. HOJNOWSKI   2,200,230
ARMORED MOTOR CAR OR TANK
Filed Nov. 30, 1938   3 Sheets-Sheet 1
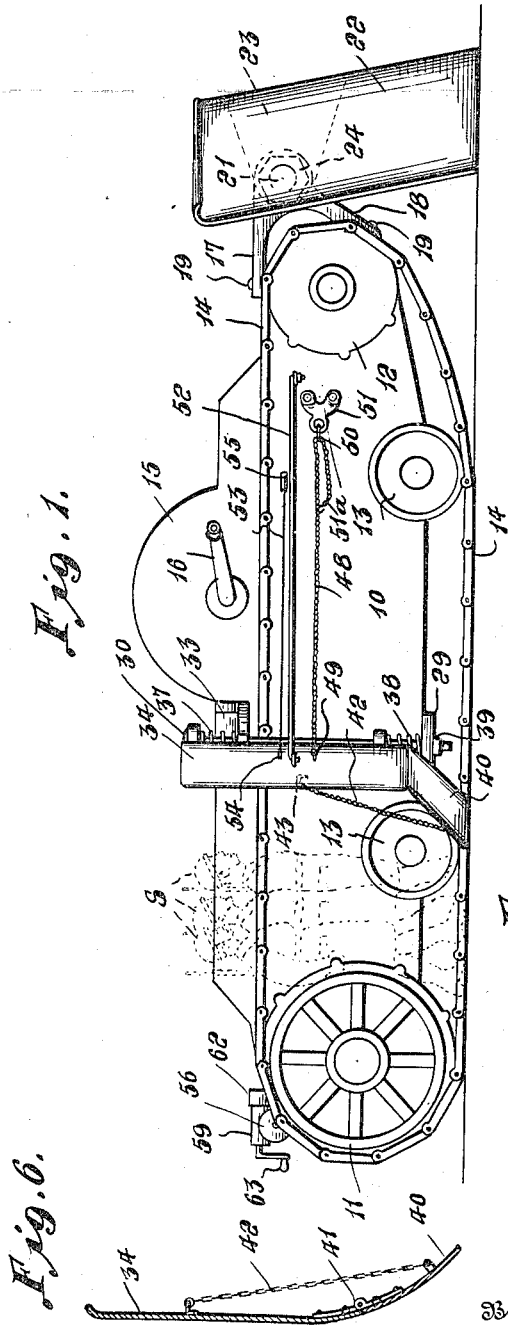
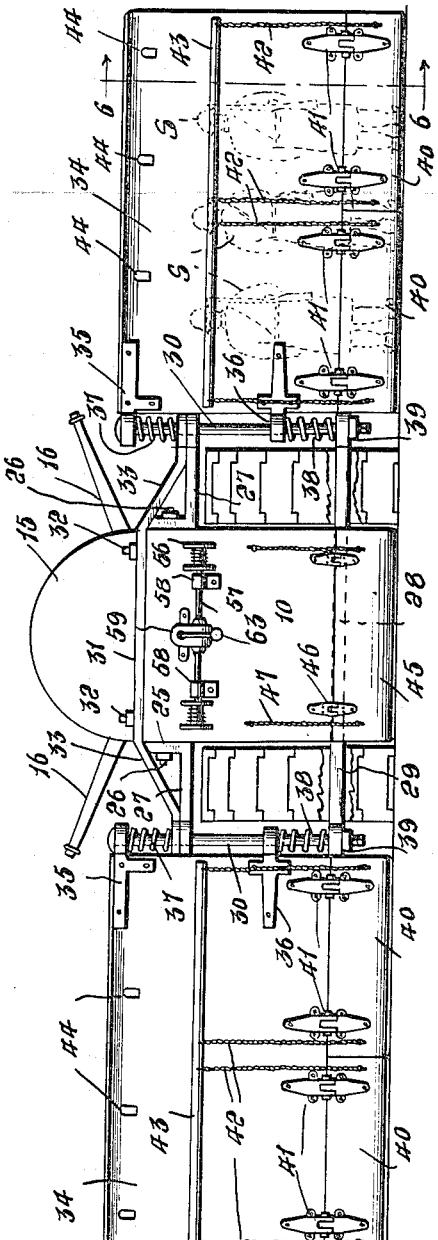
Inventor
Jakob Hojnowski
By Bryant Lowry
Attorneys

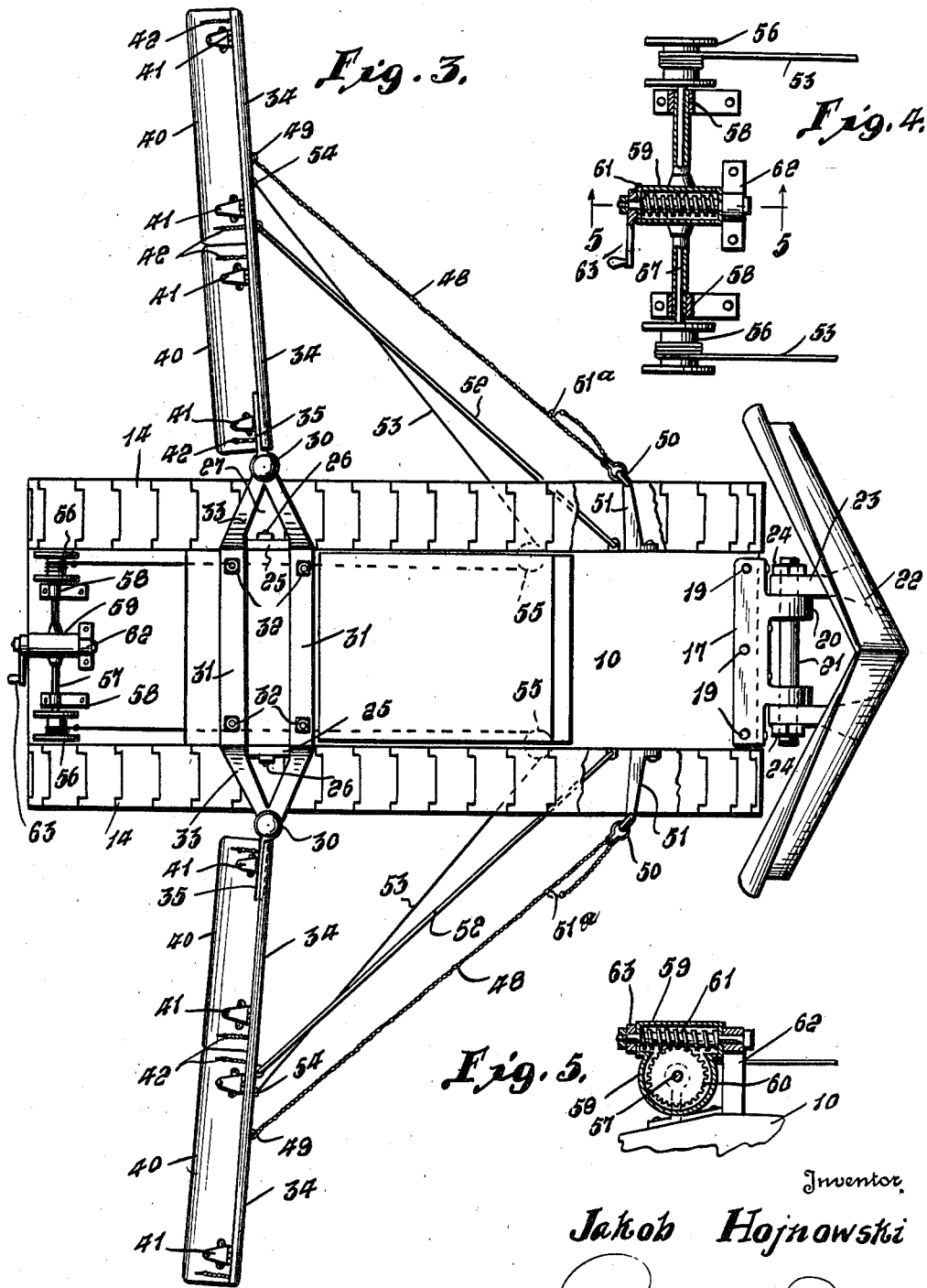

May 7, 1940.    J. HOJNOWSKI    2,200,230
ARMORED MOTOR CAR OR TANK
Filed Nov. 30, 1938    3 Sheets-Sheet 3

Inventor
Jakob Hojnowski
By Bryan N. Lowry
Attorneys

Patented May 7, 1940

2,200,230

UNITED STATES PATENT OFFICE 2,200,230

ARMORED MOTOR CAR OR TANK

Jakob Hojnowski, Nekoosa, Wis.

Application November 30, 1938, Serial No. 243,294

3 Claims. (Cl. 89—36)

This invention relates to certain new and useful improvements in armored motor cars or tanks.

The primary object of the invention is to provide an armored motor car or tank equipped with laterally disposed shields or guard walls hingedly connected at their inner ends to the side walls of the tank and adapted when operatively disposed to be located in transversely extending directions so that soldiers may march behind the guard walls and be protected thereby from enemy fire.

A further object of the invention is to provide a tank construction of the foregoing character with laterally disposed hingedly mounted guard walls with a hinged platform section at the lower end of each guard wall that may be lowered to drag over the ground and offer complete protection for soldiers marching behind the same, or to be raised to a substantially horizontal position upon which soldiers may stand and ride with gun passage openings in the upper end of the guard wall.

It is a further object of the invention to provide a tank construction having a forwardly positioned plow for leveling a road bed or path for the tank and for removing debris from the path of the tank.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a side elevational view of an armored motor car or tank constructed in accordance with the present invention, illustrating a forwardly positioned track clearing plow, a lateral wing or guard wall and soldiers illustrated by dotted lines marching rearwardly of the guard wall;

Figure 2 is a rear elevational view showing the cushioned hinge mounting for the lateral guard wall;

Figure 3 is a top plan view showing the armored motor car or tank equipped with laterally disposed guard walls hinged thereto and the brace devices and movement control members for the guard wall;

Figure 4 is a fragmentary horizontal sectional view of the movement control devices for the guard wall;

Figure 5 is a detail sectional view taken on line 5—5 of Figure 4;

Figure 6 is a vertical cross-sectional view taken on line 6—6 of Figure 2, showing the guard wall and the chain supported platform hinged to the lower edge thereof;

Figure 7:
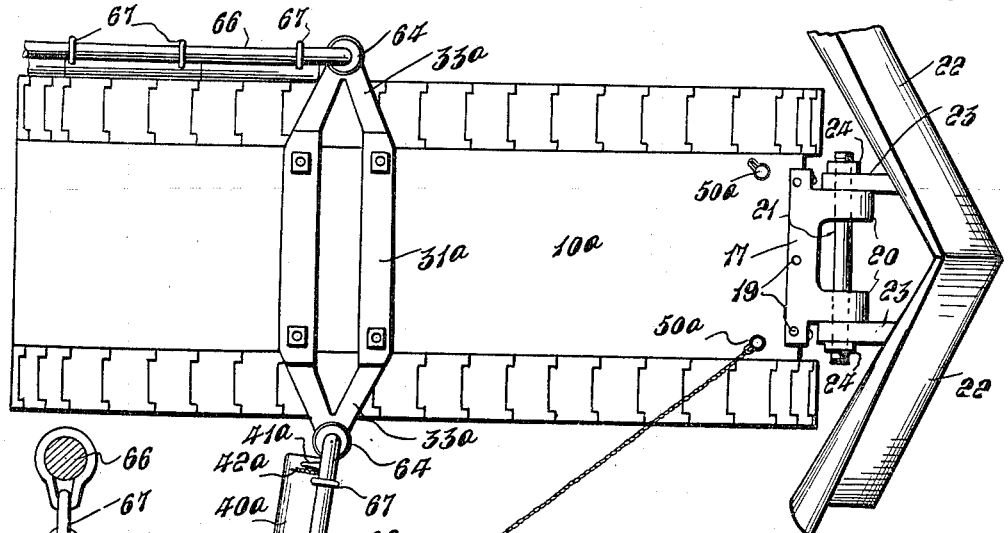
Figure 7 is a fragmentary top plan view of another form of laterally disposed guard wall.

Referring more in detail to the accompanying drawings, and to the form of invention illustrated in Figures 1 to 6, the reference character 10 designates the body of an armored motor car or tank having a caterpillar tread and drive at each side thereof that includes sprocket wheels 11 and 12 positioned respectively adjacent the rear and front ends of the tank with intermediate roller wheels 13 and over all of which wheels a sprocket chain or caterpillar tread 14 travels. The tank body 10 includes an armored hood 15 having openings therein for the passage of gun barrels 16.

A plow construction for the clearing of a path of track forwardly of the tank as shown in Figs. 1, 3 and 7 comprises a forked bracket plate having upper and lower legs 17 and 18 respectively secured at 19 to the forward end of the tank, the bracket carrying a pair of forwardly projecting ears 20 forming a bearing for the shaft 21. A V-shaped plow 22 of wall formation carries a pair of rearwardly directed ears 23 for mounting on the shaft 21 juxtaposed to the ears 20 and retained thereon by lock nuts 24 mounted on the threaded ends of the shaft 21 that move the ears 23 into binding engagement with the ears 20 to hold the plow 22 in its adjusted position.

A perpendicular shield or guard wall is hingedly supported at each side of the tank and the mounting therefor as shown in Figures 1 to 3 comprises an angle bracket having a vertical leg 25 anchored at 26 to the outer side wall of the tank 10 and an outwardly directed horizontal leg 27. A cross bar 28 extends across the bottom of the tank 10 with laterally projecting ends 29 disposed respectively below and in the vertical plane of the upper horizontal legs 27 of the angle bracket. A hinged pin 30 extends through bearing openings in the outer ends of the bracket legs 27 and the bar ends 29. The hinge pins are further supported and braced by the cross arm 31 extending across and secured as at 32 to the top wall of the tank 10 with laterally projecting ends 3 on the cross arm having bearing openings in the end thereof through which the hinge pins 30 extend.

The shield or guard wall at each side of the tank comprises a rectangular plate 34 carrying upper and lower hinge lugs 35 and 36 respectively at its inner end for mounting on the hinge pin 30, a coil spring 37 surrounding the pin 30 between the bracket leg 27 and lug 35, while a coil spring 38 surrounds the hinge pin 30 between the lug 36 and the lower end extension 29 of the bottom cross bar 28, a nut 39 being threaded onto the lower end of each hinge pin 30 with the guard plate 34 supported by the springs 37 and 38. The lower edge of the guard plate 34 has a pair of platform sections 40 hingedly mounted thereto as at 41 and said platform sections may be lowered for ground engagement so that soldiers S, indicated by dotted lines in Figures 1 and 2, marching therebehind will be fully protected by the guard wall and platform sections. The platform sections 40 are adjustably connected by flexible members 42, such as chains, to a cross-bar 43 carried by the rear face of the guard plate 34 and said chains 42 may be adjusted to raise the platform sections 40 to a substantially horizontal position so that the soldiers may stand and ride thereon and be in a position to project the barrels of their guns through openings 44 adjacent the upper edge of the guard plate 34.

A guard plate 45 is hinged as at 46 to the rear end of the tank body and may be lowered and raised by the operating chains 47, as shown in Figure 2 that are adjustably attached to the tank body. The guard plate 45 has been omitted from Figure 3 for clearer illustration of other features of the invention.

The position control and brace means for each guard wall 34 includes a chain 48 anchored at one end as at 49 to the forward side of the guard wall 34, while the forward end of the chain passes through over a link 50 carried by the outer end of the bracket arm 51 attached to the side of the tank 10, with the hook 51a on the free end of the chain 48 adjustably engaged with the run of the chain 48 as shown in Figures 1 and 3. If desired, a rigid brace rod 52 may be detachably engaged at its ends with the forward side of the guard wall 34 and the tank 10. When the guard walls are in their inoperative positions, they are moved on their hinge pins 30 in forward directions to be disposed adjacent the sides of the tank 10 and the devices for moving the guard walls to their forward inoperative positions include a cable 53 anchored at one end as at 54 to the forward side of each guard wall 34, the cable 53 passing over a guide pulley 55 adjacent the forward end of the tank 10 and then directed rearwardly for winding upon a drum 56 secured to the adjacent end of a shaft 57 journalled transversely of the tank at the rear end thereof in bearings 58, a pulley 56 being secured to each end of the shaft 57. The shaft 57 extends through a housing 59 disposed intermediate the ends thereof as shown in Figures 4 and 5 and said shaft 57 has a worm wheel 60 secured thereto, the worm 61 in the housing 57 being engaged with the worm wheel with a projecting end of the worm 61 journalled in a bearing 62 rising from the tank body 10. The other end of the worm 61 has a crank arm 63 attached thereto for manual operation thereof. Rotation of the shaft 57 is effected by operation of the worm and worm wheel for winding the cables 53 onto the drums 56 after the brace rods 52 have been removed for swinging the guard walls 34 in a forward direction on their hinge pins 30 to assume inoperative positions parallel with the side walls of the tank body.

Figure 9:
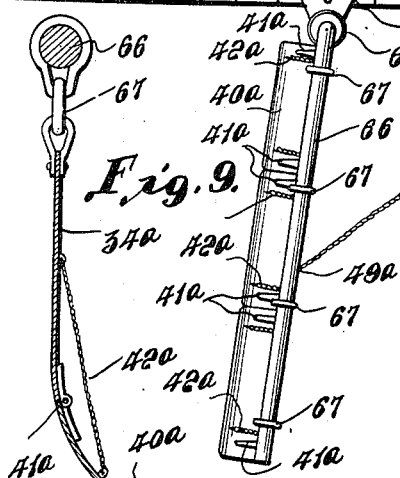
Figure 9 is a vertical cross-sectional view taken on line 9—9 of Figure 8.
Figure 8:
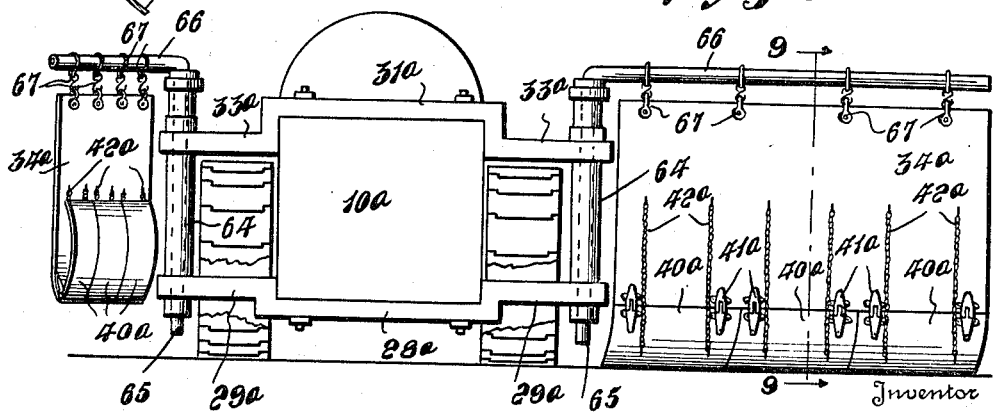
Figure 8 is a rear elevational view of the form of invention shown in Figure 7.

In the form of laterally disposed guard wall and mounting therefor as shown in Figures 7 to 9, the tank 10a carries top and bottom transversely extending bars 31a and 28a respectively with projecting ends 33a and 29a in the outer ends of which tubular bearings 64 are mounted. A vertical hinge shaft 65 is journalled in the tubular bearing 64 and carries an elongated laterally directed arm 66 at its upper end from which a guard wall 34a is suspended by means of link devices 67. Sectional platforms 40a are hinged as at 41a to the lower edge of the guard wall 34a and are raised and lowered by means of the chains 42a. To hold the guard walls 34a in their lateral operative positions disposed transversely of the tank, there is provided a chain 48a anchored at one end as at 49a to the guard wall 34a while the forward end of the chain 48a is detachably connected as at 50a to the forward end of the tank 10a. When the chain 48a is disengaged from the tank 10a, the guard wall 34a may be moved on its hinge mounting to assume a position parallel with the sides of the tank 10a adjacent the rear end thereof as indicated at the upper side of Figure 7.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:

1. In an armored motor car or tank of the character described, a tank body, bars extending transversely of the top and bottom sides of the tank body and secured thereto, end extensions on the transverse bars projecting laterally of the tank body, laterally disposed guard plates having a pivot mounting on the outer ends of said extensions, each guard plate being perpendicularly disposed and adapted for transverse placement when in service and for occupying a position substantially parallel to and adjacent the tank body when out of service and means for holding the guard plates in service positions.

2. In an armored motor car or tank of the character described, a tank body, bars extending transversely of the top and bottom sides of the tank body and secured thereto, and extensions on the transverse bars projecting laterally of the tank body, laterally disposed guard plates having a pivot mounting on the outer ends of said extensions, each guard plate being perpendicularly disposed and adapted for transverse placement when in service and for occupying a position substantially parallel to and adjacent the tank body when out of service and means for holding the guard plates in service positions, the pivot mounting for each guard plate including a perpendicular bearing shaft extending through the outer ends of the extensions on said upper and lower transverse bars, a pair of vertically spaced lugs carried by the inner end of the guard plate journaled on said bearing shaft and coil springs on the bearing shaft between the end extensions of said transverse bars and said lugs.

3. In an armored motor car or tank of the character described, a tank body, bars extending transversely of the top and bottom sides of the tank body and secured thereto, and extensions on the transverse bars projecting laterally of the tank body, laterally disposed guard plates having a pivot mounting on the outer ends of said extensions, each guard plate being perpendicularly disposed and adapted for transverse placement when in service and for occupying a position substantially parallel to and adjacent the tank body when out of service and means for holding the guard plates in service positions, said pivot mounting for each guard plate including a perpendicular bearing shaft extending through the outer ends of the extensions on said upper and lower transverse bars, a right angularly directed rod on the upper end of said shaft and means for suspending the guard plate from said rod.

JAKOB HOJNOWSKI.